INVENTORS.
Charles F. Baes, Jr.
Carlos E. Bamberger
Robert G. Ross

INVENTORS.
Charles F. Baes, Jr.
Carlos E. Bamberger
Robert G. Ross

ATTORNEY.

# RECOVERY OF PROTACTINIUM FROM MOLTEN FLUORIDE NUCLEAR FUEL COMPOSITIONS

Charles F. Baes, Jr., and Carlos E. Bamberger, Oak Ridge, and Robert G. Ross, Kingston, Tenn., assignors to the United States of America as represented by the United States Atomic Energy Commission
Filed Nov. 30, 1971, Ser. No. 203,246
Int. Cl. C01g 57/00
U.S. Cl. 423—5
2 Claims

ABSTRACT OF THE DISCLOSURE

A method is provided for separating protactinium from a molten fluoride salt composition consisting essentially of at least one alkali and alkaline earth metal fluoride and at least one soluble fluoride of uranium or thorium which comprises oxidizing the protactinium in said composition to the +5 oxidation state and contacting said composition with an oxide selected from the group consisting of an alkali metal oxide, an alkaline earth oxide, thorium oxide, and uranium oxide, and thereafter isolating the resultant insoluble protactinium oxide product from said composition.

BACKGROUND OF THE INVENTION

The invention described herein was made in the course of, or under, a contract with the U.S. Atomic Energy Commission.

This invention relates to an improved method for removing protactinium from a molten fluoride nuclear fuel composition.

In order to operate a single- or dual- (core plus blanket) region nuclear reactor using molten fluoride salt mixtures containing Th$^{-232}$ for the production of U$^{-233}$, it is essential to minimize neutron losses and effect efficient breeding.

It is, therefore, a major object of this invention to provide a method to substantially reduce the parasitic absorption of neutrons in the reactor by maintaining the concentration of Pa$^{-233}$ at a very low level in the fuel salt or blanket. For the processing to have the desired effectiveness, Pa recovery must be accomplished with a minimum inventory of fuel outside the reactor system and preferably under such conditions that the Pa is extracted with as little change in the chemical composition of the bulk salt as possible.

A process which has been developed to meet the aforementioned criteria is described in U.S. Pat. No. 3,110,555 to Shaffer et al. in which a neutron-irradiated fused fluoride salt composition consisting essentially of at least one metal selected from the group consisting of alkali and alkaline earth metal fluorides and a soluble fluoride of a metal selected from the group uranium and thorium is treated by contacting said composition with an oxide selected from the group consisting of an alkali metal oxide, an alkaline earth oxide, thorium oxide, and uranium oxide, and thereafter isolating the resultant insoluble protactinium oxide product from said composition.

The present invention constitutes an improvement in the Shaffer et al. process under conditions which result in the selective removal of Pa with a minimum change in the chemical composition of the bulk salt and a much lower inventory of fuel outside the reactor core.

SUMMARY OF THE INVENTION

Figure 1:
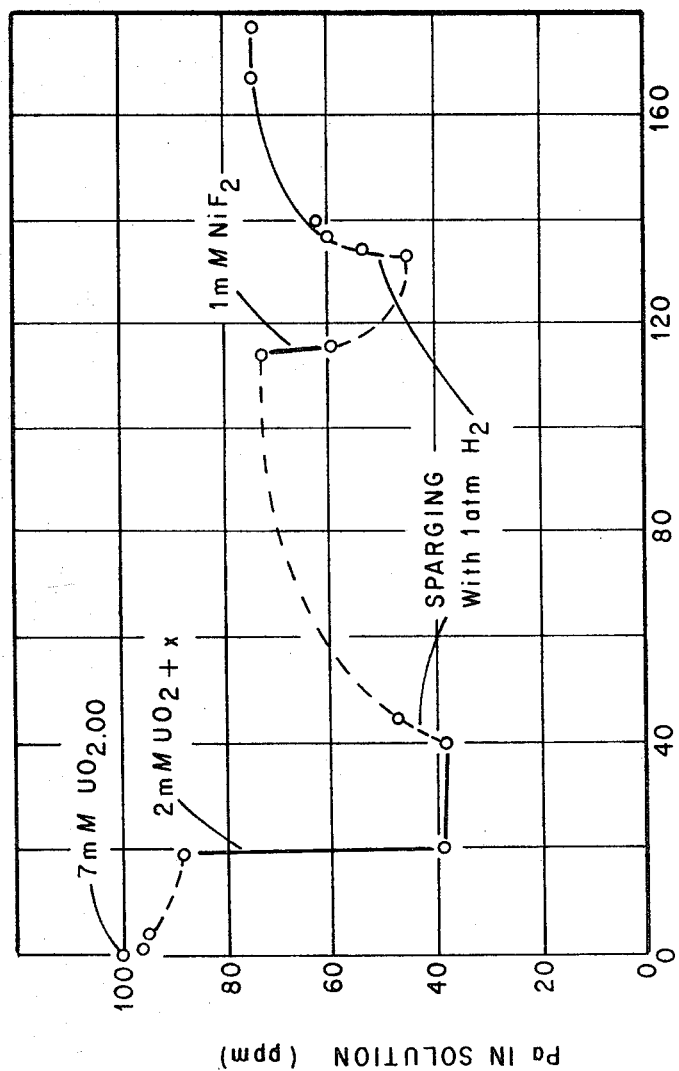
FIG. 1 shows a concentration profile of Pa in solution as a function of time and reducing or oxidizing additive.

We have discovered that the amount of Pa precipitated and the selectivity of a precipitation-inducing oxide additive for Pa is a sensitive function of the oxidation state of protactinium.

We have found that Pa can exist in a molten fluoride nuclear fuel such as LiF-BeF$_2$-ThF$_4$ (72–16–12, mole percent) or LiF-BeF$_2$-ThF$_4$-UF$_4$ (71.7–16–12–0.3, mole percent) in the +4 or +5 oxidation state. The increment of invention and the attendant advantages resulting therefrom are based on our discovery that the solubility of a Pa oxide, where Pa is in the +5 oxidation state as in Pa$_2$O$_5$, is much less than the corresponding Pa oxide in the +4 oxidation state, as in PaO$_2$. As a result, it requires a great deal less of an oxide additive precipitant to effect precipitation of Pa in the +5 oxidation state as compared to the amount needed to precipitate Pa in the +4 oxidation state. Since less precipitate-inducing reagent is added, it leads to the additional advantage of reducing or eliminating co-precipitation of other components of fuel. The amount of precipitant-inducing oxide needed to quantitatively remove Pa in the +4 oxidation state can frequently result in exceeding the solubility product of other metals of the molten fluoride system, principally uranium and thorium. On the other hand, we found the solubility product of Pa$_2$O$_5$, expressed as $[Pa^{5+}]^2[O^{2-}]^5$, where the quantities in brackets are concentrations, to be so much lower than that of the metals of the other oxides in molten fluoride systems that it can be clearly separated with minimum addition of reagent and minimum change in the chemical composition of the salt (i.e., no precipitation of uranium or thorium).

Proctactinium normally exists in the +4 oxidation state in molten fluoride systems known to be useful as a fuel or blanket material in a single- or two-region molten fluoride salt breeder reactor. In order to practice this invention, it is necessary to convert the Pa to the +5 oxidation state and then selectively precipitate the Pa as an oxide. This can be done by one of two modes. In a first mode, a single reagent is used to accomplish oxidation and precipitation of Pa. In a second mode, oxidation and precipitation are effected by two reagents. Among the reagents which will both oxidize and Precipitate Pa from a fluoride melt are NiO, UO$_{2+x}$ (where $x$ has a value up to 0.2), U$_3$O$_8$, PuO$_2$, Fe$_3$O$_4$, H$_2$O, metal hydroxides, mixtures of CO$_2$-CO, and metal carbonates. A reagent which will oxidize Pa to the +5 oxidation state may be selected from the group HF, F$_2$, NiF$_2$, PuF$_4$, CuF, or CuF$_2$. Electrolysis may also be a way of converting Pa to the pentavalent state. As a practical matter, the two-step mode is preferred, using HF, NiF$_2$, or PuF$_4$ as the oxidizing agents followed by precipitation of the resultant Pa$^{+5}$ values with an oxide selected from the group consisting essentially of an alkali oxide, an alkaline metal oxide, thorium oxide, and uranium oxide. This mode results in a minimum change in the chemical composition of the melt being treated and reduces the possibility of adverse co-precipitating reactions.

The following examples illustrate specific embodiments of how the invention can be practiced. All experiments were conducted in a system consisting of nickel or copper containers provided with mechanical stirring or gas sparging to effect the equilibrium of molten and solid phases of appreciably different densities. The apparatus was gas leak-tight and was provided with ports for thermocouples, gas lines, and a valved port for the addition of reagents and the removal of samples. Atmospheric contamination was avoided while the system was being studied. Samples of the melt were obtained using copper filter sticks. The filtered samples were analyzed for Pa$^{-231}$ using gamma spectrometry with a Li-drifted Ge crystal. Uranium determinations were performed by neutron activation on $U^{-235}$ and by chemical analysis. Material balance calculations were performed throughout the course of the experiment to determine the composition of the molten fluoride phase. The samples were withdrawn at various intervals and equilibrium was assumed to be attained when consecutive samples showed differences in composition within the analytical uncertainty.

Example I

This example is intended to show the advantage of precipitating Pa in its +5 rather than in its +4 oxitation state and also illustrates how the invention is practiced by mode, 2, i.e., by $U_{2+x}$ (in this case $x=0.2$) addition or by the additions of $NiF_2$ to a system where oxide has been previously added.

A fused fluoride melt consisting of $LiF\text{-}BeF_2\text{-}ThF_4\text{-}UF_4$ (76–16–12–0.25, mole percent) and 100 parts Pa per million parts by weight of fluoride melt was treated with an excess of $UO_2$ more than sufficient to precipitate all the Pa. The melt was subsequently treated with $UO_{2.2}$, sparged with $H_2$ to reduce $Pa^{+5}$ to $Pa^{+4}$ and then with $NiF_2$ to reoxidize $Pa^{+4}$ to $Pa^{+5}$. The results of these treatments are shown in FIG. 1, which shows a concentration profile of Pa in solution as a function of time and reducing or oxidizing additive. First of all, it is seen that a surprisingly small fraction (~10%) was precipitated by $UO_2$ addition. A subsequent addition of hyperstoichiometric $UO_2$, an oxidant represented by $UO_{2+x}$ (where $x\simeq.$), however, caused a sharp increase in the amount of Pa precipitated. Hydrogen sparging of the mixture returned much of the Pa back to solution, while subsequent addition of $NiF_2$ (an oxidant) again resulted in precipitation of Pa. It is clear from this example that the extent of Pa precipitation increases with increased oxidation of the system. It should be noted that NiO would give the same oxidizing effect as $NiF_2$.

Example II

This example is given to illustrate a convenient way to practice the invention according to the second mode, where two reagents are used to effect separation of Pa as $Pa_2O_5$.

A $LiF\text{-}BeF_2\text{-}ThF_4$ mixture (72–16–12, mole per cent) containing 2420 parts Pa per million parts by weight of fluoride mixture was hydrofluorinated by bubbling HF at about 0.7 atmosphere at 563° C. to effect oxidation of Pa to the pentavalent state. Small amounts of $ThO_2$ were then added in incremental amounts with samples of the melt being analyzed after each oxide addition, allowing at least 16 hours for equilibration.

The results are shown in Table I, below.

TABLE I

| Pa in solution (p.p.m.) | | | Cumulative amount of $ThO_2$ added to hydrofluorinated mixture | |
|---|---|---|---|---|
| 563° C. | 668° C. | 730° C. | Millimoles/mole | g./100 g. |
| 2,420 | 2,420 | 2,420 | 0 | 0 |
| 1,079 | | | .48 | 0.204 |
| 380 | | | .73 | 0.309 |
| 144 | | | .81 | 0.342 |
| | | 906 | .81 | 0.342 |
| | | 488 | 1.06 | 0.444 |
| | | 258 | 1.29 | 0.538 |
| | 44 | | 1.29 | 0.538 |

It can be seen that the data reflect quantitative precipatation of Pa. By calculation of the amount of oxide ion in solution by a material balance based on the amount of $ThO_2$ added and the amount of Pa presumed to exist as $Pa_2O_5$, the solubility product of $Pa_2O_5$ was estimated to be $10^{-30}$ at 563° C., $10^{-25}$ at 668° C., and $10^{-23}$ at 730° C.

Example III

This example shows another way to practice the invention by the second mode. NiO is used as an example of a reagent which oxidizes $Pa^{+4}$ to $Pa^{+5}$ and together with $UO_2$ added previously effects the precipitation of Pa as $Pa_2O_5$.

Initially, 780 p.p.m. $UO_2$ was added to $LiF\text{-}BeF_2\text{-}ThF_4$ mixture containing 2,000 part Pa per million parts by weight of fluoride mixture. Afterwards, 220 p.p.m. NiO and 570 p.p.m. $UO_2$ were added in incremental amounts. Melt samples were analyzed for Pa after each addition after an equilibration period of at least 18 hours. The results are shown in Table II.

TABLE II

| Amount Pa in solution (p.p.m.) | | G. added/100 g. fluoride mixture | |
|---|---|---|---|
| 561° C | 660° C. | NiO | $UO_2$ |
| 1,880 | 1,974 | 0 | 0.078 |
| 1,510 | 1,913 | 0.008 | |
| 1,150 | 1,500 | 0.008 | 0.057 |
| 1,100 | | 0.006 | |

The amounts of Pa found in solution are consistent with the values expected from the solubility products measured from data in Table I.

Example IV

This example shows still another way to practice the invention by the second mode. A molten $LiF\text{-}BeF_2ThF_4$ mixture is contacted with excess $ThO_2$ in order to saturate it with oxide and then the oxidant ($NiF_2$ or NiO) is added. Experimentally, this was demonstrated by contacting the molten fluoride mixture with excess $ThO_2$ and NiO and measuring the equilibrium $Pa^{+5}$ concentration as a function of temperature.

TABLE III

| Amount Pa in solution (p.p.m.) | Temp. (° C.) | Solids added in excess to saturation |
|---|---|---|
| 900 | 740 | $ThO_2$. |
| 32 | 740 | NiO plus $ThO_2$. |
| 12 | 698 | Do. |
| 1.2 | 625 | Do. |

The above data show the extremely low concentrations of Pa that can be attained with the highest concentration of oxide under oxidizing conditions.

Example V

This example, similar in concept to the previous one, was demonstrated using a molten $LiF\text{-}BeF_2\text{-}ThF_4$ (72–16–12, mole per cent) mixture containing initially 0.3 mole per cent $UF_4$. The presence of uranium causes the solid phase that forms at oxide saturation to become a solid solution of $UO_2$ and $ThO_2$, its composition depending on the amount of uranium present in the fluoride phase and the temperature. As will be seen below, solid solutions of $UO_2\text{-}ThO_2$, rich in $UO_2$, being significantly less soluble than pure $ThO_2$, produce significantly lower concentrations of oxide, thus causing the amount of Pa in solution in equilibrium with $Pa_2O_5$ to be higher than in Example IV, as expected from the constancy of the solubility product. In this example, HF was used as the oxidant.

The experiment consisted in measuring the concentration of Pa in solution in the presence of excess $UO_2\text{-}ThO_2$ solid solution as a function of temperature. The latter was formed in situ by the addition of $ThO_2$ to a hydrofluorinated molten mixture of $LiF\text{-}BeF_2\text{-}ThF_4\text{-}UF_4$.

TABLE IV

| Amount Pa in solution (p.p.m.) | Temp. (° C.) | Saturating solid |
|---|---|---|
| 2,240 | 560 | |
| 47 | 658 | $Pa_2O_5$ and $UO_2\text{-}ThO_2$ ss. |
| 65 | 700 | Do. |
| 131 | 750 | Do. |

Example VI

This example is given to illustrate, quantitatively, the difference in behavior of $Pa^{+4}$ and $Pa^{+5}$ in the presence of oxide, when $ThO_2$ is used as the precipitating oxide.

The procedure involved incremental addition of $ThO_2$ microspheres to 200 g. of $LiF\text{-}BeF_2\text{-}ThF_4$ (72–16–12, mole percent) containing 1800 p.p.m. Pa which had been extensively reduced by flowing hydrogen through it. The tetravalent (reduced) state was maintained by keeping the melt under a hydrogen atmosphere.

After each oxide addition was made, the melt was sampled at various temperatures and analyzed for Pa. The results are shown Table V.

TABLE V

| Pa in solution (p.p.m.) | | Th₂ added (g./100 g.) |
|---|---|---|
| 569° C. | 663° C. | |
| 1,800 | 1,800 | 0 |
| 1,610 | -------------- | 0.071 |
| 1,500 | -------------- | 0.047 |
| 1,245 | -------------- | 0.095 |
| 1,010 | 1,236 | 0.183 |

Figure 2:
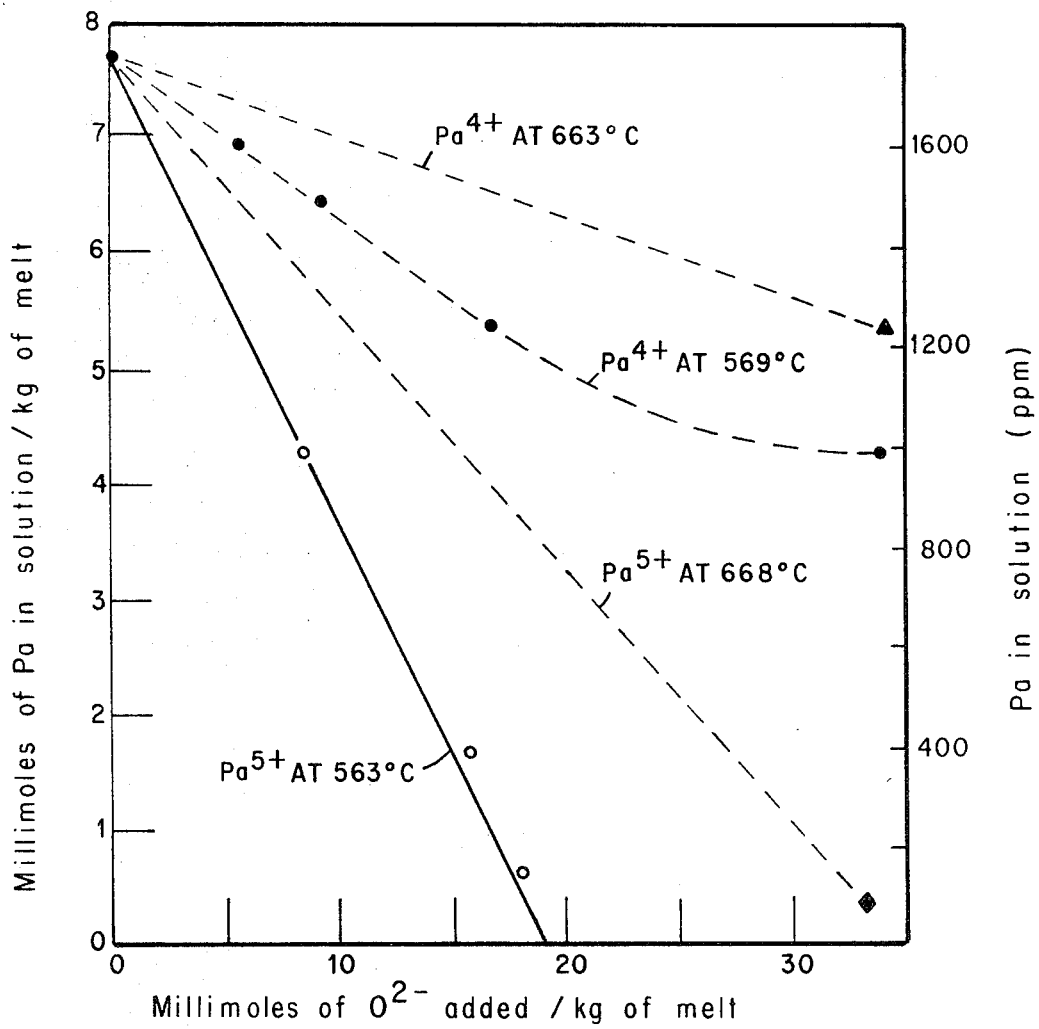
FIG. 2 shows a comparison of the concentration profiles of Pa in solution in its reduced and oxidized states.

The data from Table V along with the data from Table I are presented graphically in FIG. 2. From FIG. 2 it can be seen that the behavior of the two oxidation states is markedly different in that $PaO_2$ ($Pa^{+4}$) oxide is considerably more soluble than $Pa_2O_5$ ($Pa^{+5}$).

It is therefore clear that these data established that Pa can be selectively precipitated from a molten fluoride mixture of the general character used in molten salt reactor fuel systems without prior or concurrent removal of uranium or thorium.

We have thus shown by this and the preceding examples and description that the oxidative precipitation of protactinium from a representative fused fluoride melt is markedly more enhanced by reaction of the Pa-containing melt with a reagent which converts the Pa to a higher oxidation state than it normally exists in the melt. Oxidation to the higher oxidation state can be accomplished in single reaction (first mode in which a single reagent functions to both oxidize the Pa to a higher oxidation state and effect its precipitation as an insoluble oxide, as a $Pa_2O_5$-containing phase. Examples of reagents which can be used to practice the first mode are NiO, CuO, $H_2O$, $PuO_2$, metal hydroxides, metal carbonates, $UO_{2+x}$ (where $x$ has a value up to 2.2), $U_3O_8$, and mixtures of $CO_2$ and CO. As a practical matter, the choice of metal hydroxide or carbonate should be limited to the metal species comprising the fluoride composition to be treated.

In accordance with a second mode of practicing the invention, the Pa-containing fluoride melt is hydrofluorinated or fluorinated to effect oxidation of Pa to the +5 oxidation state whereupon precipitation of Pa can be effected by an oxide which will effect precipitation of $Pa^{+5}$. In general, any oxide which will precipitate $Pa^{+4}$ in solution will be effective to precipitate $Pa^{+5}$ with the advantage that less oxide will be needed to precipitate a given amount of Pa. Among the inorganic metal oxide precipitants which are operable to selectively convert protactinium in molten fluoride compositions to a separable insoluble oxide product are alkali metal oxides such as lithium oxide, sodium oxide, rubidium oxide; alkaline metal earth oxides such as beryllia and calcium oxide; and refractory metal oxides such as zirconia, alumina, uranium oxide, and thorium oxide. Again, as a practical matter, however, it is preferred that the precipitating oxide be selected from an oxide of the corresponding metal fluorides comprising the composition to be treated.

What is claimed is:

1. A method of separating protactinium from a molten fluoride salt composition consisting essentially of a least one alkali or alkaline earth metal fluoride and at least one soluble fluoride of uranium or thorium which comprises oxidizing the protactinium in said composition to the +5 oxidation state by the addition of a reagent selected from the group consisting of HF, $F_2$, $NiF_2$, $PuF_4$, CuF, and $CuF_2$ to the protactinium-containing fluoride melt and contacting said composition with an oxide selected from the group consisting of an alkali metal oxide, an alkaline earth oxide, thorium oxide, and uranium oxide, and thereafter isolating the resultant insoluble protactinium oxide product from said composition.

2. The method according to claim 1 in which oxidation of Pa to $Pa^{+5}$ and precipitation of Pa as $Pa_2O_5$ are effected by addition of $H_2O$, NiO, $UO_{2+x}$ (where $0 < X \leq 0.2$), $U_3O_8$, $PuO_2$, metal hydroxides, metal carbonates, or mixtures of $CO_2$ and CO.

References Cited

UNITED STATES PATENTS

| 3,110,555 | 11/1963 | Shaffer et al. | 423—11 |
| 3,577,225 | 5/1971 | Shaffer et al. | 252—301.1 R |

FOREIGN PATENTS

| 1,115,920 | 6/1968 | Great Britain | 423—11 |

CARL D. QUARFORTH, Primary Examiner

F. M. GITTES, Assistant Examiner

U.S. Cl. X.R.

252—301.1 R; 423—3, 11, 249